United States Patent [19]

Eldridge et al.

[11] Patent Number: 4,521,451

[45] Date of Patent: Jun. 4, 1985

[54] ENCAPSULATED MAGNETIC RECORDING DISK

[75] Inventors: Jerome M. Eldridge, Saratoga; Andrew M. Homola, Morgan Hill, both of Calif.

[73] Assignee: International Business Machines Corporation, Armonk, N.Y.

[21] Appl. No.: 538,029

[22] Filed: Sep. 30, 1983

[51] Int. Cl.$^3$ .............................................. B05D 5/12
[52] U.S. Cl. .................................. 427/130; 427/128; 427/374.7
[58] Field of Search ................................ 427/127–132, 427/48, 374.7; 428/900, 694

Primary Examiner—Bernard D. Pianalto
Attorney, Agent, or Firm—Thomas R. Berthold; Walter J. Madden, Jr.

[57] ABSTRACT

A hermetically encapsulated magnetic record member is produced by applying a liquid mixture containing one or more organometallic compounds, an organic solvent system and magnetic particles to a thermally stable substrate, preferably of silicon. The applied mixture is then heated to melt the glass in the organometallic compound so that upon cooling of the glass, the magnetic particles are encapsulated therein.

5 Claims, No Drawings

ENCAPSULATED MAGNETIC RECORDING DISK

BACKGROUND OF THE INVENTION

Cross Reference To Related Application

Co-pending application Ser. No. 453,415, filed Nov. 22, 1982, discloses the use of silicon as a substrate for a magnetic recording disk.

Field Of Invention

This invention relates in general to magnetic recording disks, and relates more particularly to such disks having an encapsulated recording layer.

Description Of Prior Art

In magnetic recording, the use of disks having either particulate or thin film magnetic coatings on aluminum substrates is well known. Each of these types of coatings has problems associated therewith which render them less than totally desirable, particularly for extremely thin coatings which are required for high bit density recording patterns being used now and in the future.

Particulate magnetic coatings on aluminum substrates, especially in extremely thin layers, often exhibit limited durability with respect to contact with the magnetic transducer associated with the disk. Thin film magnetic disks, usually produced by sputtering, evaporation or electroplating of a magnetic coating on an aluminum substrate, generally provide magnetic coatings which are thinner than those available with particulate coatings. However, thin film disks often exhibit significant corrosion problems, primarily because of the reaction between the metal substrate, which has been required to be aluminum because of weight considerations, and the deposited thin film layer. Such disks have required the deposition of two or more protective layers between the substrate and the thin film magnetic layer and over the thin film layer. Understandably, the requirement for these protective layers has added significantly to the cost of the thin film disk. Additionally, both particulate and thin film magnetic disks usually have employed a substrate of substantial thickness relative to the coating thickness, thereby adding appreciably to the weight of an assembly which includes several of such disks.

Since thin films of metals or polymers typically replicate the substrate surface, the necessity to try to achieve surface perfection (i.e., asperity free, flat, etc., to prevent amplitude modulation and head crashes) in aluminum substrates has been a traditional problem. While improvements in substrate polishing and coatings have been made, future major performance improvements will rely on enhancements of the substrate surface.

Copending application Ser. No. 443,515, assigned to the same assignee as the present application, identified above, discloses the use of a single crystal silicon wafer as a substrate for a magnetic layer. The primary advantage of the use of silicon as a recording disk substrate is its extreme surface smoothness, which smoothness can be obtained with minimum effort and cost. This is in contrast to the extensive machining, such as grinding or diamond turning on a lathe, which is required to produce usable Al alloy substrates of the type employed in most present day magnetic recording disks.

U.S. Pat. No. 4,376,963 discloses a magnetic recording disk employing a silicon substrate mounted in a reinforcing core member of polymeric material.

The English Abstract of Published Unexamined Japanese patent application No. 56-157577, published Apr. 9, 1983 mentions the use of a Si wafer as a substrate for a sputtered thin film magnetic recording disk.

SUMMARY OF THE INVENTION

The present invention provides a magnetic recording disk having a thermally stable substrate on which is placed a magnetic recording layer which can be encapsulated or sealed after application to the substrate.

DESCRIPTION OF THE PREFERRED EMBODIMENT

The present invention utilizes the relatively high thermal stability of materials such as silicon or Fotoceram (a trademark applied to a glass material supplied by Corning Glass Works) compared to that of Al alloys, to permit placing on such a substrate a magnetic recording mixture which contains one or more organometallic compounds. The organometallic compounds may be selected from those containing Si, P, or Al. Examples of suitable organometallic compounds for use in the present invention are silicon tetraethoxysilane, aluminum isopropoxide, sodium methoxide and potassium ethoxide. After application of this mixture to the substrate, it is processed at moderate temperatures to produce a glass material which effectively encapsulates the magnetic recording layer for mechanical and corrosion protection, as will be described below.

The organometallic compound or compounds are first mixed in a suitable organic solvent, such as butyl carbitol, cellosolve or gylcols. Thin (a few hundred Å) films of such solutions, when exposed to air, lose solvent, hydrolyze to residues which can then be converted to glass films on heating to moderate ($\gtrsim 400°$ C.) temperatures. Suitable selection of reactants, solvents and processing cycles yield glass films having the necessary properties for the present invention. Such properties include an expansion coefficient to roughly match those of the substrate and magnetic particles (to prevent cracking); adequate hardness to withstand head-disk interference (HDI); adhesion to the substrate; and, chemical stability.

A suitable polymer (e.g., an epoxy, or phenolic resin) is preferably added to the common organic solvent system in order to increase the solution viscosity sufficiently so that film thicknesses in the desired range (e.g., 0.05 to 0.3 $\mu$m) will result when the solution is spun onto the substrate. In addition, the rheology of the solvent-organometallic-polymer system can be adjusted by hydrolyzing the silicon ester (the main component of the final glass film) prior to mixing with the other reagents.

Particles of magnetic material, preferably of ellipsodial shape, are suspended in the above solvent-organometallic-polymer system. This magnetic material could be elemental iron, or cobalt, or an appropriate ferromagnetic oxide (gamma-$Fe_2O_3$, $Fe_3O_4$ and the like) or even a rare earth oxide. The magnetic particles are preferably on the order of 500 to 2000 Å.

The solvent-organometallic-polymer-magnetic particle suspension can be applied to the substrate by the well known spin coating procedure. Film coating thickness can be controlled as indicated above and by control of the spinning speed. Advantageously, the spinner may be partially enclosed to retard premature solvent loss and hydrolysis. The magnetic particles can be magnetically aligned in the usual way during this step.

Necessary solvent removal and hydrolysis reactions can be carried out at modest ($\sim 100°$ to $200°$ C.) temperatures in a closed furnace system having controlled moisture and oxygen contents. Carbonaceous materials would be completely oxidized and volatilized at temperatures around $400°$ to $500°$ C. Complete oxidation of the metallic components in the organometallics will occur at this time also. Care must be taken to ensure that only limited oxidation (near the surface) of the magnetic metallic particles occurs, if they are present. This unwanted oxidation should be retarded because of the passivating effect of the surrounding glass matrix. Further heating (to approximately $500°$ to $700°$ C. or higher) in an inert atmosphere will then melt the glass, leaving the magnetic particles imbedded and aligned therein. Glass films (e.g., borosilicates) have been prepared from solutions of organometallics at temperatures far below the liquidii of the component oxides, as shown for example in U.S. Pat. No. 3,759,683. Structures containing gamma-$Fe_2O_3$ would have to be processed at a maximum temperature $\lesssim 560°$ C. to prevent formation of the thermodynamically stable but nonferromagnetic gamma-$Fe_2O_3$ phase. Structures containing elemental Fe or Co or alloys thereof would not have this temperature limitation and could be processed at temperatures well above $500°$ C. to $600°$ C., but in an inert ambient to prevent excessive and unwanted oxidation. Structures containing $Fe_3O_4$ as the initial magnetic additive can be modified by suitable control of the oxygen partial pressure and the thermal cycle so that this oxide is transformed to the metastable, ferromagnetic gamma-$Fe_2O_3$ phase while embedded in the glass matrix.

In summary, the present invention teaches a method of producing a hermetically sealed magnetic medium supported by a thermally stable substrate. It utilizes no costly vacuum equipment and applies the magnetic binder system in the usual, simple and inexpensive manner. Automated spinner and furnace systems can be used. The hermetic sealing of elemental Fe, Co or Fe-Co particles appears to offer substantial reliability advantages over that attainable with polymeric-based matrices, since the latter are far less effective moisture and corrosion—promoting contaminant (e.g., HC1) barriers. Signal-to-noise considerations favor the use of metallic rather than oxide particle because of the greater volume magnetization of the former. The wear characteristics of the glass-encapsulated structures should be much better than polymeric-coated disks. Replacement of the polymer with the glass, along with the use of a thermally stable substrate, removes a variety of thermally-based processing restrictions in the search for ever-improved recording media.

We claim:

1. A process for preparing a magnetic recording member comprising the steps of
   preparing a liquid mixture containing an organic solvent, magnetic particles and one or more organometallic compounds, at least one of the organometallic compounds containing silicon,
   applying said liquid mixture to a nonmagnetic thermally stable substrate,
   heating said applied mixture to a temperature sufficient to form a melted glass material from the organometallic compound,
   and cooling said melted glass material to heremetically encapsulate said magnetic particles.

2. A process in accordance with claim 1 in which said nonmagnetic substrate is silicon.

3. A process in accordance with claim 2 in which said organometallic compounds are compounds containing aluminum, sodium or potassium.

4. A process in accordance with claim 1 in which said substrate is fotoceram.

5. A process in accordance with claim 1 including the step of adding a liquid polymer to said liquid mixture to control the viscosity of said mixture.

* * * * *